(12) United States Patent
Dhillon

(10) Patent No.: US 9,215,910 B2
(45) Date of Patent: Dec. 22, 2015

(54) SOLE COVER DISPENSER DEVICE

(71) Applicant: Baljinder Singh Dhillon, Modesto, CA (US)

(72) Inventor: Baljinder Singh Dhillon, Modesto, CA (US)

( * ) Notice: Subject to any disclaimer, the term of this patent is extended or adjusted under 35 U.S.C. 154(b) by 0 days.

(21) Appl. No.: 13/970,864

(22) Filed: Aug. 20, 2013

(65) Prior Publication Data

US 2014/0048214 A1 Feb. 20, 2014

Related U.S. Application Data

(60) Provisional application No. 61/691,061, filed on Aug. 20, 2012.

(51) Int. Cl.
  B32B 38/10 (2006.01)
  A43D 11/00 (2006.01)
  A43D 999/00 (2006.01)
  A43B 3/16 (2006.01)
  B32B 43/00 (2006.01)

(52) U.S. Cl.
  CPC ............. *A43D 11/003* (2013.01); *A43B 3/163* (2013.01); *A43D 999/00* (2013.01); *B32B 38/10* (2013.01); *B32B 43/006* (2013.01); *Y10T 156/11* (2015.01); *Y10T 156/1174* (2015.01); *Y10T 156/19* (2015.01); *Y10T 156/195* (2015.01); *Y10T 156/1956* (2015.01)

(58) Field of Classification Search
  CPC .... B32B 38/10; B32B 43/006; Y10T 156/11; Y10T 156/1174; Y10T 56/19; Y10T 56/195; Y10T 156/1956
  USPC ............ 156/701, 715, 750, 759, 760; 221/45, 221/171
  See application file for complete search history.

(56) References Cited

U.S. PATENT DOCUMENTS

| | | | |
|---|---|---|---|
| 3,903,620 A | 9/1975 | Gillet | |
| 7,377,054 B2 | 5/2008 | Milner et al. | |
| 7,559,159 B1 | 7/2009 | Lundberg | |
| 7,669,351 B1 * | 3/2010 | Ghotbi | 36/7.1 R |
| 8,024,872 B2 | 9/2011 | Pettis | |
| 2005/0217450 A1 * | 10/2005 | Tracy | 83/649 |
| 2006/0144879 A1 * | 7/2006 | Hu | 223/111 |
| 2006/0254090 A1 | 11/2006 | Baxter | |
| 2007/0204568 A1 * | 9/2007 | Chen | 53/459 |
| 2008/0000035 A1 * | 1/2008 | Levine et al. | 12/1 R |
| 2009/0152312 A1 * | 6/2009 | Li | 223/113 |
| 2010/0288800 A1 * | 11/2010 | Xu | 223/113 |

\* cited by examiner

*Primary Examiner* — Philip Tucker
*Assistant Examiner* — Nickolas Harm
(74) *Attorney, Agent, or Firm* — Daniel Boudwin; Global Intellectual Property Agency LLC

(57) ABSTRACT

The present invention describes a dispenser of protective covers for the sole of a shoe. The sole covers are disposed on a sheet that is placed within the dispenser. The dispenser comprises a series of roller supports that are adapted to position the sheet of solve covers onto an exposed platform. A user steps the exposed platform in order to apply the cover to the user's footwear and remove the sole cover from the sheet. The top of the sole cover includes an adhesive that enables the cover to adhere to the sole of the user's shoe, thereby enabling a user to walk around the house while reducing the likelihood that the user would spread dirt therein.

13 Claims, 5 Drawing Sheets

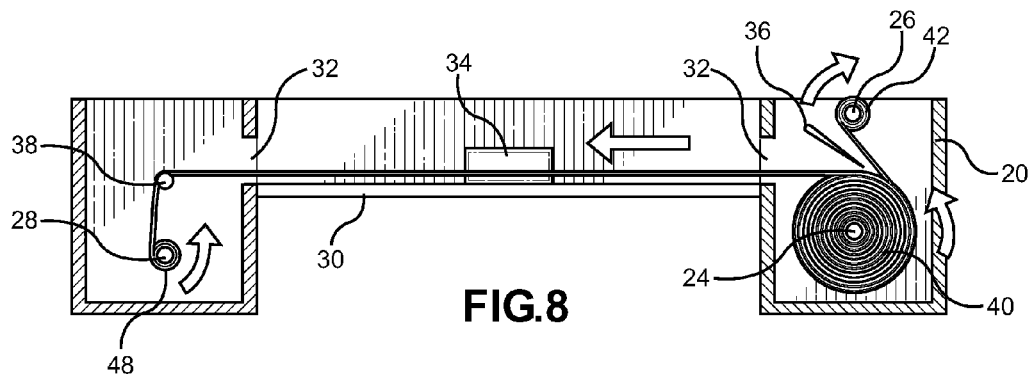
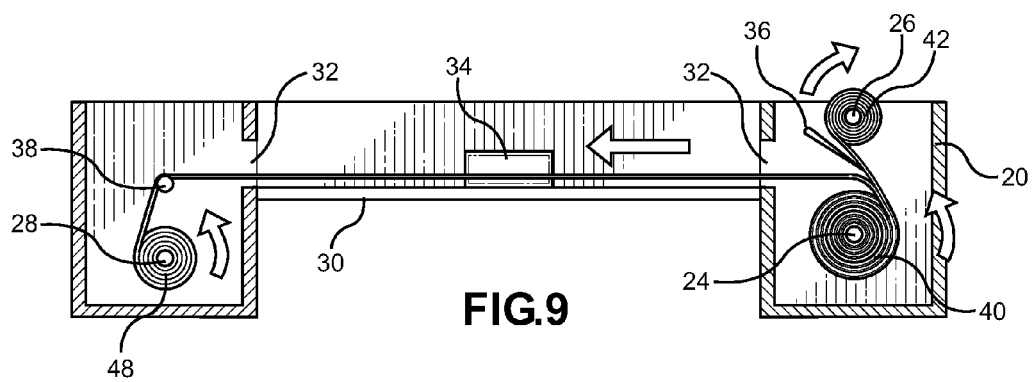
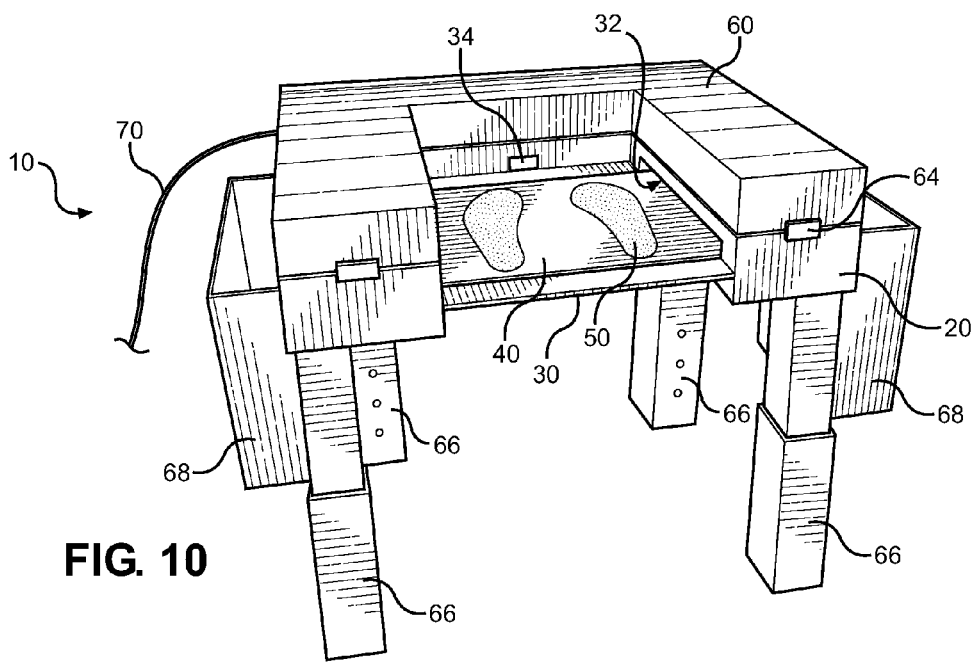

SOLE COVER DISPENSER DEVICE

CROSS REFERENCE TO RELATED APPLICATION

This application claims the benefit of U.S. Provisional Application No. 61/691,061 filed on Aug. 20, 2012, entitled "Sole Mat." The above identified patent application is herein incorporated by reference in its entirety to provide continuity of disclosure.

BACKGROUND OF THE INVENTION

1. Field of the Invention

The present invention relates to sole coverings and dispensers therefore. More specifically the invention relates to a dispenser of disposable sole coverings that once applied reduce transfer of dirt and bacteria into indoor spaces covering the sole of a user's shoe. The sole coverings are sized to fit the shoes of a user, and thus are convenient in homes of users that do not wish to have shoes piled near the doorway.

There are many ways that bacteria can spread through a home, and the most overlooked way is by footwear. Everyday people enter and exit homes, and the majority of them fail to properly cover their shoes. The soles of a person's shoes can quickly change a clean room into an unsanitary one after repeated use, particularly if many users enter the room while wearing soiled footwear.

When a person walks into a house with their footwear on, the soles of the footwear bring along a portion of the contamination that they've come in contact with while outdoors. The soles of shoes can bring gum, dirt, mud, feces, grasses and other elements that might disrupt the cleanliness of the house. It doesn't take much time for a carpet to become imbedded with these elements. And because shoes transfer and deposit the dirt and grasses of wherever a person walks, the task of cleaning the floors becomes seemingly endless. Walking around the house in shoes that have soles contaminated with dirt, grasses and other unsanitary elements can lead to unclean floors and the spread of germs and bacteria. These unsanitary elements can create a room that is no longer aesthetically pleasing, and also increases the risk of causing and spreading sicknesses.

The most popular method of reducing the transfer between shoe soles and a floor is to have users remove their shoes once they enter a house. This solution reduces the area of the house that comes into contact with the soles of the footwear; however this solution quickly causes clutter at the entrance of the house and is not always convenient for all users. People who desire to have a clean house often have issues with clutter at the entrance of their houses caused by the placement of shoes at the front door. Temporary solutions to the clutter are to neatly place the shoes on a mat at the doorway or to place the footwear on shelving, but when there are multiple pairs of shoes, the entrance is bound to be covered with footwear, which can lead to unsafe situations.

There are several devices that attempt to reduce the transfer of undesirable elements from the sole of footwear throughout the house. These devices include coverings that enclose the sole of footwear to protect the sole from damage, or those that reduce the spread of undesirable contaminants throughout the house. The setback of existing devices is that these sole attachments are often bulky or not disposable. Additionally, some of the devices are not equipped with a mechanism that enables hands free attachment of the cover to the sole.

The present invention comprises a device configured for dispensing a footwear cover that is adapted to eliminate direct contact between the sole of a shoe and the interior floor of a home. The sole cover has a top surface comprising an adhesive that is adapted to adhere to the sole of a shoe, and a protective bottom layer formed from a durable material that permits the user to walk around on a variety of surfaces without damaging floors. The sole cover dispensing device includes an upper lid and a base, which form an internal compartment therebetween. The inside of the base is an electric motor, a motion sensor, and a set of rollers that are configured to expose the sole covers and their supporting sheet across an open platform within the center of the device. A processor within the motion sensor communicates with the motor and relays information on the removal of a sole cover from the platform. The processor then sends a signal that drives the motor, thereby causing the rollers to rotate and expose another set of covers over the platform. The device can be actuated without the use of a user's hands, or alternatively, the device may comprise a manual actuator. The dispenser device facilitates the decrease of germs within the household, and further provides a unique mechanism that aids in reducing the clutter at the doorway caused by leaving footwear at the entrance of a house.

2. Description of the Prior Art

Devices have been disclosed in the prior art that relate to sole covers. These devices generally relate to footwear covers and means of dispensing the same. The following is a list of devices deemed most relevant to the present disclosure, which are herein described for the purposes of highlighting and differentiating the unique aspects of the present invention, and further highlighting the drawbacks existing in the prior art.

One such device is U.S. Pat. No. 3,903,620 to Gillet, which describes a sole attachment that covers the sole and heel of a shoe. The top surface of the sole attachment comprises an adhesive layer that enables securement to a shoe by pressing the top surface against the sole of a seal. Additionally the sole attachment comprises a fold lines that enable the adjustment of the length of the sole attachment. Although the sole covering of Gillet is similar in nature and relevant to the present invention, it differs in that it fails to provide a dispensing device that aids in the attachment of the sole cover on to footwear without the use of the user's hands.

U.S. Pat. No. 5,694,704 to Kasbrick and U.S. Patent Publication No. 2006/0254090 to Baxter both teach removable shoe coverings. The shoe covering is formed of a flexible sheet having a central section that covers the sole of the shoe and outwardly extending side portions that wrap around the shoe. Furthermore, an adhesives on the outwardly extending portions adhere to each other when the side portions overlap and secure the covering to the shoe. While the coverings of Kasbrick and Baxter are similar in nature and relevant to the present invention, they differ in that they wrap around the shoe for securement, fail to provide a more compact shoe covering, and further differ in that they lack hands free attachment of the sole to the shoe bottom.

Another such device is U.S. Pat. No. 7,377,054 to Milner, which describes a disposable sole for a shoe of a user. The sole is used to reduce the exchange of elements, such as dirt and grime and is meant for use in the home, office, and/or public restrooms and is applied to the sole of a shoe by a pressure sensitive adhesive. Although the disposable sole of Milner is similar in nature and relevant to the present invention, it differs in that it fails to provide a convenient and hands free means for attaching the sole cover onto the sole of the footwear.

U.S. Pat. No. 7,559,159 to Lundberg describes a protector for the sole of a shoe or bare foot. The sole protector is disposable and has a ground touching surface and a foot touching surface having an adhesive. A plurality of sole protectors are detachably secured to each other in tables form and are shaped to fit directly onto the feet or bottom of shoes. While the sole protectors of Lundberg are similar in nature and relevant to the present invention, they differ in that they fail to provide a holder for the protectors, and further fail to provide a hands free means for attaching the sole cover onto the sole of footwear.

Finally, U.S. Pat. No. 8,024,872 to Pettis describes a sole protector for a shoe that is adapted to attach to and cover the entire sole. The sole protector comprises a removable peel layer adjacent to an adhesive layer that attaches to the sole of the shoe. Although the sole protector of Pettis is similar in nature and relevant to the present invention, it differs in that it fails to provide a holder for the protectors, and further fails to provide a hands free means for attaching the sole cover onto the footwear.

The present invention relates to a new and improved device that dispenses sole covers for a user to eliminate contact between the soles of a user's shoes and an interior floor, while dispensing the same without requiring the user to manually apply the covers. The device includes an upper lid and a lower base that form a housing having an internal compartment and an exposed central area. Within the internal compartment is a set of rollers, a rolled sheet of sole covers, and a means for dispensing the sole covers over the exposed central area of the device from the rolled sheet. A user steps onto the platform, thereby attaching the sole cover to sole of a user's shoe one at a time, which removes the sole cover from the exposed section of sheet. The dispensing device and sheet of removable sole covers aid in decreasing the spread of unsanitary elements into indoor spaces, and aids in reducing the clutter of shoes left at the entrance of a house, office, or other dwelling by enabling a user to keep their shoes on and attach the sole covers without manual application.

In view of the drawbacks of the prior art devices, it is submitted that the present invention is substantially divergent in design elements from the prior art, and subsequently it is clear that there is a need in the art for an improvement to existing sole attachment devices. In this regard the instant invention substantially fulfills these needs.

SUMMARY OF THE INVENTION

In view of the foregoing disadvantages inherent in the known types of sole coverings now present in the prior art, the present invention provides a new sole cover dispenser device that can be utilized for providing convenience for the user when attachment of a sole cover without the need to strap or manually apply the cover onto the sole of footwear is desired.

The present invention is designed for those who wish to keep a sanitary household without being required to remove footwear at the entrance of the house. The present invention comprises a plurality of sole cover pairs that are disposed on a rolled sheet and removable therefrom, along with a dispensing device for holding and dispensing the sheet across an exposed platform for the user to attach the covers to the user's footwear without manual application. The sole covers have an upper adhesive layer that attach to the sole of a shoe, along with and a lower surface that is designed for contact with the ground. Each of the sole covers is removable from the sheet after adhering to the user's soles.

The dispensing device comprises a compartment having an upper lid forming an internal volume therein. The internal volume comprises a plurality of mechanisms that facilitate the exposure of a length of the sole covering sheet, one pair at a time. These mechanisms include a plurality of rollers that are either manually driven or driven by means of electric motor control. The rolled sheet is first installed on set of rollers within the compartment, whereafter the sheet is pulled across the platform and drawn taught between opposing rollers to expose a single pair of covers. A user then steps onto the sheet, which is supported by the platform. The adhesive upper layer of the sole cover adheres to the user's footwear when the step thereonto, whereafter the individual sole covers are peeled from the sheet when the user steps off of the platform. This enables a user to attach a covering onto the sole of their shoes without manual application, thereby enabling them to walk around their household without spreading dirt, germs, and other unwanted debris.

It is therefore an object of the present invention to provide a new and improved sole covering means and dispensing device that has all of the advantages of the prior art and none of the disadvantages.

It is another object of the present invention to provide a sole covering means disposed along a rolled sheet, whereby pairs of sole covers having an upper adhesive surface and a lower durable surface is provided and can be removed from the sheet by adhesive attachment to a user's shoe.

Another object of the present invention is to provide a sole cover dispensing device that is adapted to allow for application of a sole cover to a user's footwear without manual application, wherein the sole covers are disposed along a sheet and exposed in turn by way of manual or electric motor input.

Yet another object of the present invention is to provide a sole cover dispenser device that comprises a set of rollers that distribute a sheet of sole covers onto an exposed platform.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 8 shows a cross-sectional view of the sole cover disperser.

FIG. 9 shows a cross-sectional view of the sole cover dispenser while in use.

FIG. 10 shows a view of the sole cover dispenser with adjustable legs configured to lift the device into an elevated position.

DETAILED DESCRIPTION OF THE INVENTION

Figure 1:
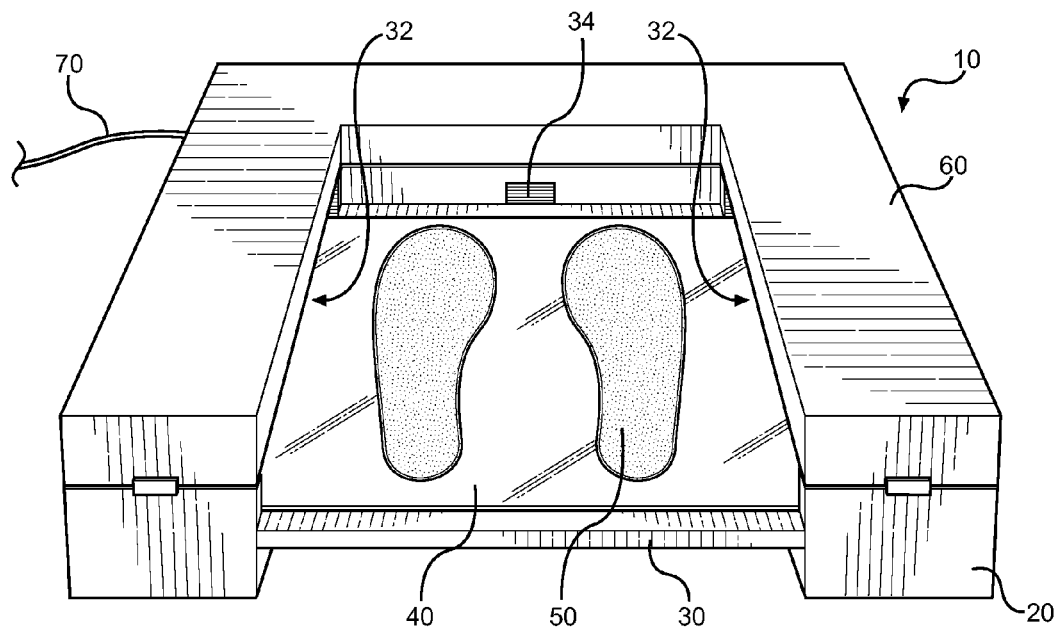
FIG. 1 shows an overhead perspective view of the sole cover dispensing device of the present invention.

Reference is made herein to the attached drawings. Like reference numerals are used throughout the drawings to depict like or similar elements of the sole covering dispensing device and sole cover sheets. For the purposes of presenting a brief and clear description of the present invention, the preferred embodiment will be discussed as used for dispensing sole covers adapted to cover the soles of shoes for reducing the spread of undesirable elements into indoor spaces. The figures are intended for representative purposes only and should not be considered to be limiting in any respect.

The present invention relates to a device that dispenses a sheet that includes covers for the soles of shoes disposed thereon. The covers are configured for adhesive attachment to the soles of a user's shoes, wherein the covers reduce the spread of bacteria, dirt, debris, and germs around a household. Moreover, the dispensing is designed to provide hands-free access to the sole covers, wherein a user steps onto an exposed platform to apply a pair of sole covers to his or her footwear, and then steps therefrom with the covers applied. Once a pair of covers is removed from the sheet, a subsequent pair of sole covers is exposed for a subsequent user.

Figure 2:
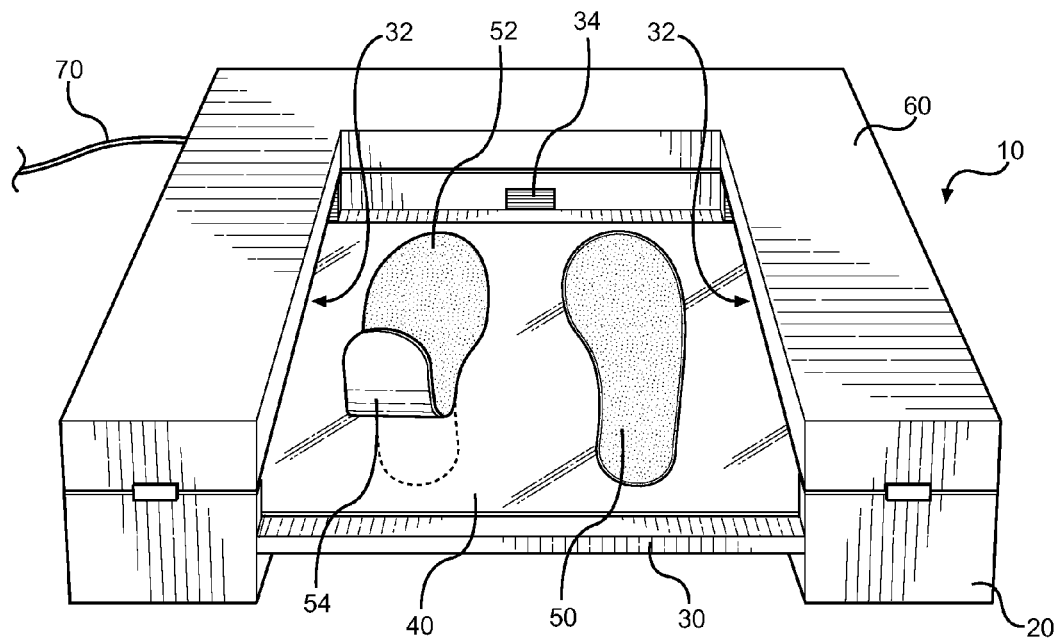
FIG. 2 shows an overhead perspective view of the sole protector being removed from the exposed sheet while positioned over the exposed surface of the dispensing device.

Referring now to FIGS. 1 and 2, there are shown overhead perspective views of the sole cover dispensing device of the present invention. The dispensing device 10 comprises a U-shaped enclosure having a lower base portion 20 and an upper lid 60 that is hingedly secured to the lower portion 20. When closed, the base portion 20 and lid 60 form an interior compartment housing a plurality of rollers adapted to support a sheet 40 of sole covers 50 and dispense the same across an exposed platform 30 across the U-shaped enclosure. The platform 30 is an exposed area that is adapted to support a pair of sole covers 50 positioned thereover, along with the weight of a user who steps thereon to apply the covers 50 to a user's footwear.

The dispensing device 10 of the present invention is either manually driven or electrically driven, whereby a advancing of the sheet 40 is accomplished by an advancing means that is controlled by manual input or by electric motor input. If electric motor driven, a powering means (i.e. AC power 70 or battery power) powers at least one electric motor that facilitates movement the sole cover sheet 40 onto and across the platform 30. The interior of the device 10 includes a plurality of rollers that are operatively connected to the advancing means. These rollers and advancing means can be activated by a motion sensor 34 or by manual input, wherein the electrically driven embodiment comprises an internal processor that controls the advancement amount such that a single pair of sole cover 50 is exposed at one time. The user (through manual input) or a sensor can determine the distance that the sheet 40 is advanced through slots 32 located on either side of the platform 30.

The sheet 40 comprises a plurality of removable sole covers 50 thereon and are attached onto the sheet 40 in a side-by-side manner, whereby there are multiple pairs covers 50 thereon adapted to be exposed together as a set. In order to attach the covers 50 to a user's shoe, the coves are designed to be removable from the sheet 40 when stepped on by a user. The upper surface 52 of the sole cover 50 comprises an adhesive layer that facilitates the attachment to the sole of a user's footwear when the user steps thereon and subsequent removal of the cover therefrom when the user steps away. The adhesive layer attaches the sole cover 50 onto the shoe sole while the user is indoors, while the bottom surface 54 is designed to be durable in order to maintain its structure when used in a household.

Each of the sole covers 50 is removable from the sheet 40 in a peeling nature or by way of perforation, whereby the cover 50 is integrally formed into the sheet. Each cover is made of a recyclable, hypoallergenic and antibacterial material. The covers 50 are shaped to accommodate a typical shoe shape and can be deployed in different sizes. The covers 50 are compatible with most shoes and are non-slip, lightweight, flexible, water resistant, and may be made of plastic, rubber, synthetics, polyurethane, or a combination thereof. The sole covers 50 may also be constructed of clear materials that enable the soles of the footwear to maintain their appearance.

Figure 3:
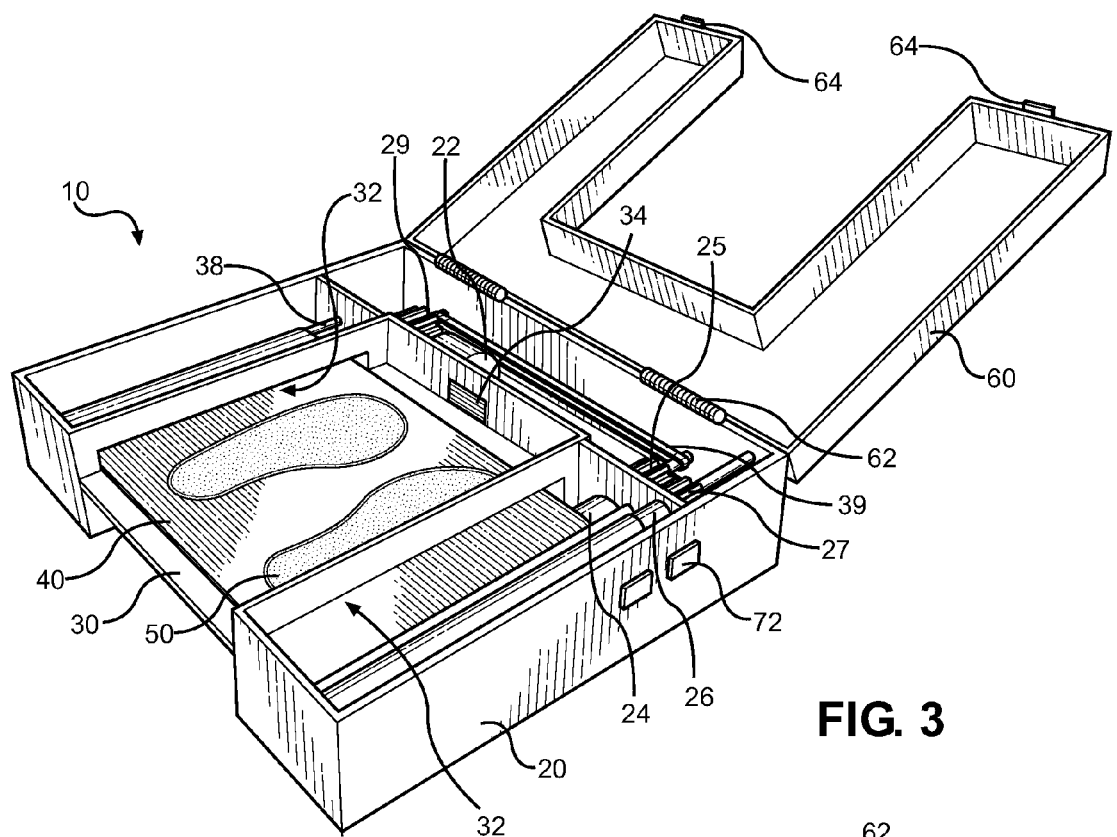
FIG. 3 shows view of the dispenser device in an open configuration, whereby the internal roller mechanisms used to distribute the sole covers are visualized.
Figure 4:
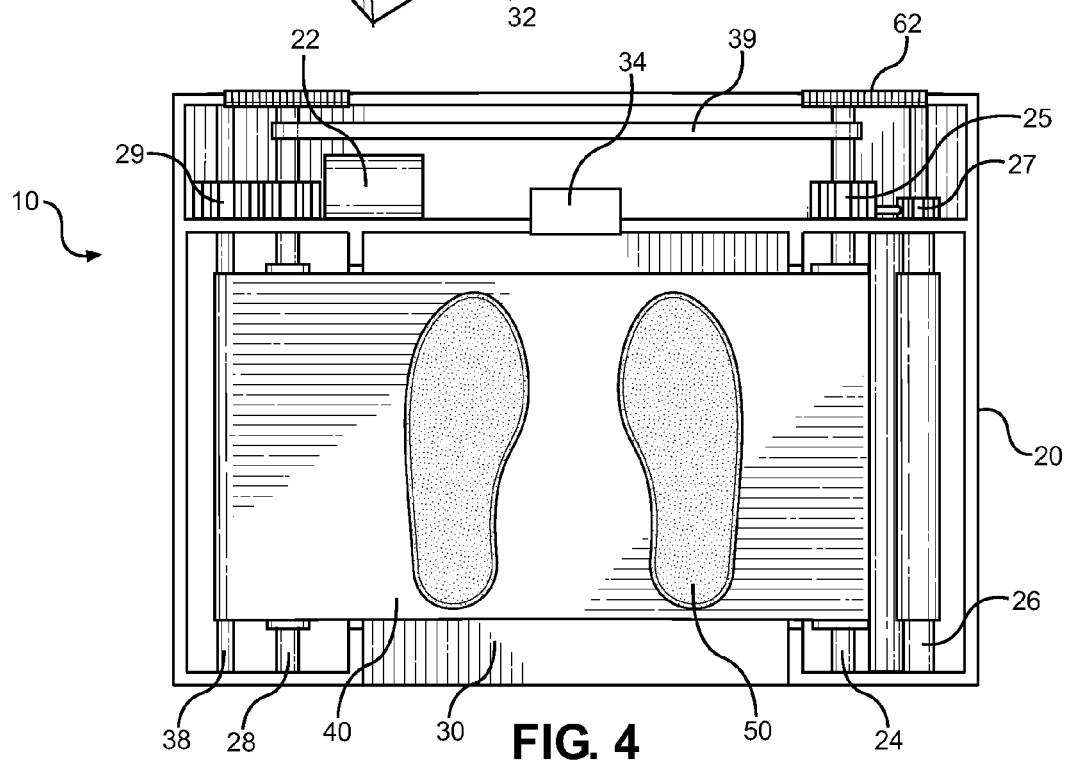
FIG. 4 shows an overhead view of the interior of the motor driven dispensing device.

Referring now to FIGS. 3 and 4, there are shown opened, perspective view and overhead view of the device 10, respectively. These views illustrate the internal components of the dispensing device 10 that facilitate the movement of the sheet 40 of sole covers 50 across the platform 30 and into an opposing slot 32 for the collection of the sheet 40 after removal of the sole covers 50. In the embodiment shown in FIGS. 3 and 4, the advancing means comprises at least one electric motor and pulley system for dispensing the rolled sole cover sheet across the device 10. The interior components in this embodiment comprise at least one electric motor 22 and a set of rollers (28, 38, 24, and 26). The pulleys are driven directly by electric motors, by a pulley 39 attached to an electric motor, or further by a gear set attached to the motor. In either embodiment, the rollers accomplish concurrent movement to advance the sheet 40 to expose the sole cover pairs 50. The rollers include a first primary roller 24 that holds a fresh roll of sole covers, a second top collection roller 26 that is adapted to collect a peelable separation layer over the sole covers, a third opposing bottom sheet collection roller 28 that collects the remaining sheet 40 after sole cover removal, and a tensioning roller 38 that maintains tension on the sheet between the primary 24 and opposing bottom sheet collection roller 28.

The electric actuation of the rollers are activated by a motion detector 34 or by advancement buttons 72 located along the outer portion of the device 10. At least one motor 22 receives commands from a processor, which communicates with the motion detector 34 and/or the directional advancement buttons 72, thereby determining which direction and how far the sheet 40 is moved across the platform 30. It is contemplated that one or several motors may be disposed within the device for accomplishing rotation of the rollers. In one embodiment, a single motor 22 is operatively connected to the gear 29 of the bottom collection roller 28 and facilitates the rotation of the roller 28. The bottom collection roller 28 includes a belt 39 that connects to the primary roller 24, which facilitates simultaneous movements of the rollers. Additionally, the primary 24 and top collection 26 rollers each comprise gears 25, 27 that operatively connect to each other, thereby providing concurrent rotational movement between the primary roller 24 and the top collection roller 26, thus providing that each of the rollers rotate at the same time and rate.

Figure 5:
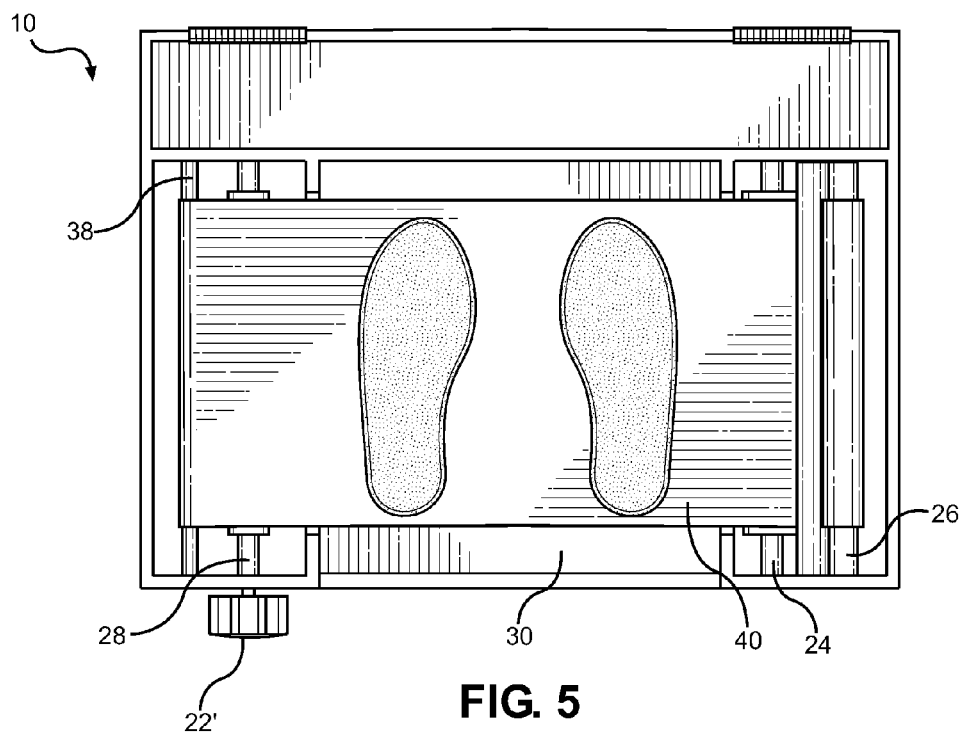
FIG. 5 shows an alternative embodiment of the dispensing device, whereby the device is manually actuated.

Each movement of the motor 22 facilitates the rotation of each of the rollers 24, 26, 28, which in turn moves the sheet 40 forward or in a reverse direction; however, in the alternative embodiment of FIG. 5, the device 10 is manually actuated. Similar to that of the preferred embodiment, the embodiment of FIG. 5 includes a set of rollers 24, 26, 28, which are operatively connected and perform like movements. Manual actuation of a knob 22' or foot pedal that is connected to the bottom collection roller 38 causes the collection roller 28 to rotate. The rotation of the collection roller 28 facilitates the rotation of the opposing rollers 24, 26, thereby moving the sheet 40 across the platform 30 for the use of the user. This embodiment does not require electric motor input and achieves advancement by way of the belt/gear set.

Figure 6A:
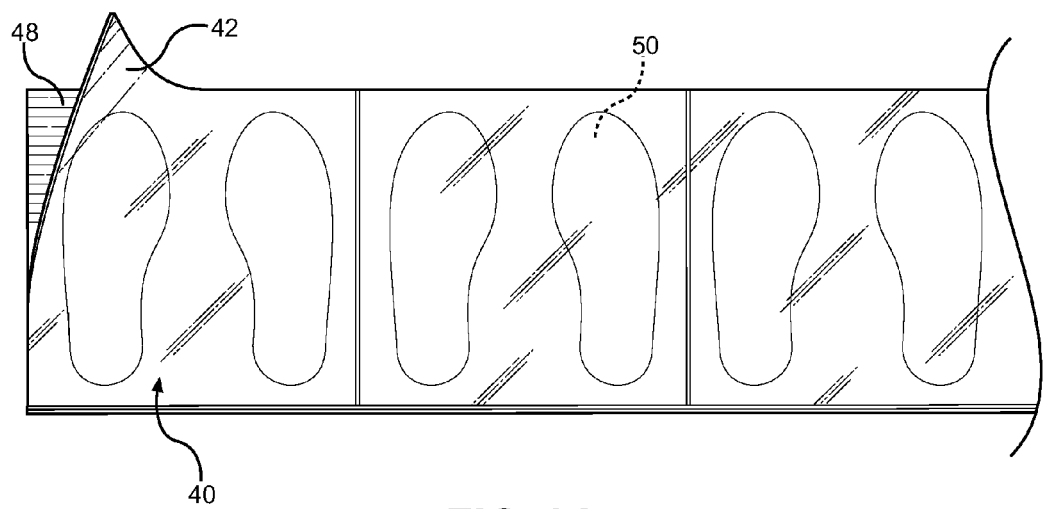
FIG. 6A shows a view of the sole cover sheet and an upper peeling layer being removed therefrom.
Figure 6B:
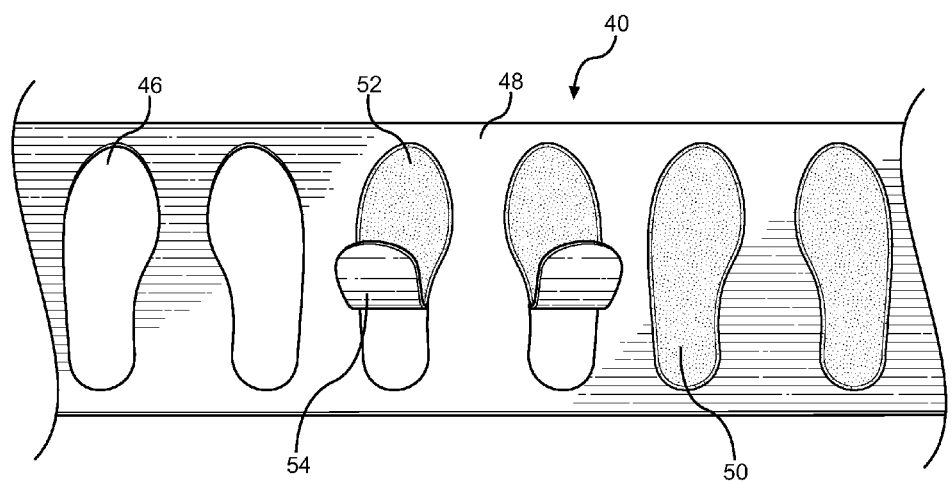
FIG. 6B shows a view of the sole cover sheet, whereby the upper layer of the sheet is removed and a pair of foot pads are being removed therefrom.

Referring now to FIGS. 6A and 6B, there are shown views of the sole cover sheet 40, whereby FIG. 6A displays an unseparated sheet 40 and FIG. 6B displays the bottom layer 48 of the separated sheet 40. FIG. 6A shows the layers of the sheet 40. The sheet 40 includes a non-stick upper layer 42, a bottom layer 48, and sets of sole covers 50 disposed therebetween. The upper layer 42 covers and protects the interior of the sheet 40 from damages and further preserves the adhesive layer 52 of the sole covers 50, thereby enabling the sole cover 50 to attach onto the bottom of a shoe.

In FIG. 6B, there is shown a view of the sheet 40, whereby the upper layer 42 is peeled away from the bottom layer 48, thus exposing the sole covers 50. The covers 50 are disposed in-line with the sheet 48 or are disposed thereon. If in-line, the covers 50 are connected by a perforated line of connection, wherein the sheet is removed 46 when the cover 50 is attached to the user's sole. The in-line configuration enables the sole cover 50 to lie flush with the remainder of the sheet 40 to provide a more even rolled sheet 40. In either embodiment, the user can readily remove the cover 50 from the sheet 48 by stepping thereon and adhering the cover 50 to the footwear. To remove the cover 50 from the platform, a user steps on the adhesive layer 52 of the cover, thus affixing the adhesive layer 52 on the sole of a shoe.

Figure 7:
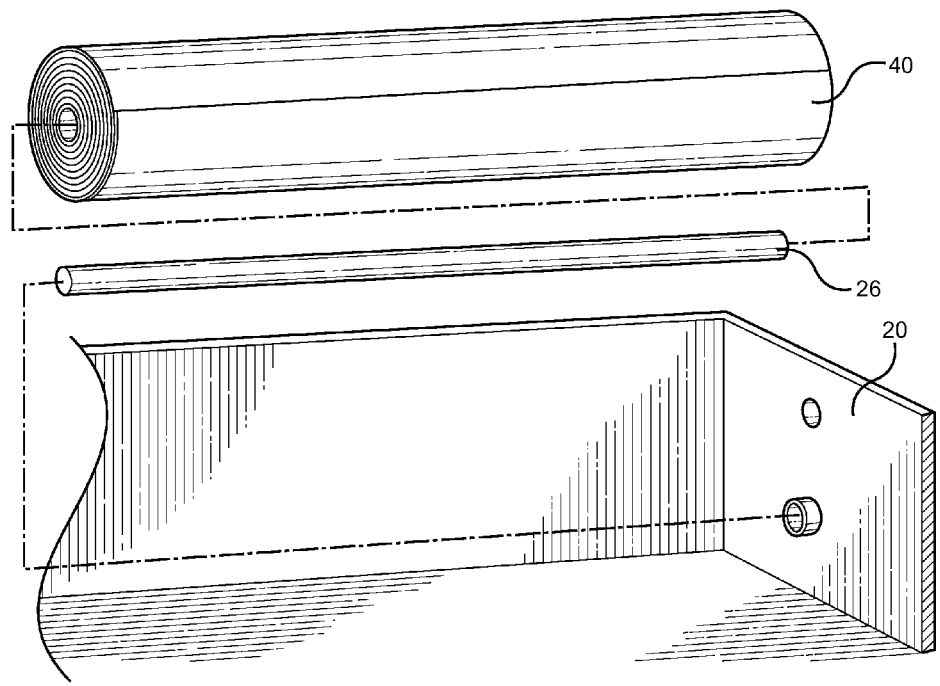
FIG. 7 shows a view of the sole cover sheet being installed onto a removed roller.

Referring now to FIG. 7, there is shown a view of the sole cover sheet 40 being installed on the primary roller 24. The primary roller 24 is removable from the interior of the base portion 20 in order to install a rolled up sheet of sole covers 40 thereon. Thereafter, the roller 24 and sheet 40 are inserted into the base 20 in order to permit use of the device 10.

FIGS. 8 and 9 display cross-sectional views of the sole cover dispenser and the position of the sole cover sheet 40 between the set of rollers 24, 26, and 28. The sheet 40 comprises a non-stick upper layer 42, a bottom layer 48, and a series of sole covers 50 disposed therebetween. Prior to use, a portion of the upper layer 42 of the sheet 40 must be separated from the bottom layer 48, in order to affix the layers to the proper rollers. During installation within the base portion 20, the upper 42 and lower layers 48 of the sheet are separated. The user wraps the upper layer 42 around the top collection roller 26, and pulls the remaining bottom layer 48 across the platform 30. The bottom layer 48 is pulled over the tensioning rod 38, which provides a proper angular orientation for the bottom layer 48 to wrap around the bottom collection roller 28. Thereafter, the bottom layer 48 is wrapped around the collection roller 28.

During activation of the device 10, the bottom collection roller 28 is operatively connected to the primary 24 and top collection roller 26 by a belt 39 (see FIG. 4). Rotation of the bottom collection roller 28 pulls the sheet 40 from the primary roller 24, which in turn rotates the top collection roller 26. The sheet 40, which is split in to upper 42 and lower layers 48, continues to be separated onto the top collection 42 and bottom collection rollers 28, respectively, when movement of the rollers is actuated. To facilitate the separation of the layers, the base portion 20 may comprises a wedge 36 that separates the upper layer 42 from the bottom layer 48 by splitting the two sections apart.

Referring now to FIG. 10, there is shown a view of the sole cover device 10 of the present invention, including several accessories. The device 10 may lie on the ground, or alternatively may comprise a set of height adjustable legs 66 attached thereto. The legs 66 are telescopic in order to accommodate different heights, and may be removed for storage or for use on the ground. Additionally, the device may comprise side-mounted waste baskets 68 for collection of used sole covers 50. The baskets 68 are attached to the sides of the device 10 and may be used for containing items therein, such as extra rolls of sheets 40 or be used for the disposal of used sole covers 50.

The dispensing device 10 and arrangement of the sole cover sheet 40 facilitates the attachment of a sole cover 50 onto the bottom of a user's shoes without manual attachment. The dispensing device 10 comprises a lower base portion 20 and an upper lid 60, between which internal mechanisms facilitate the dispensing of a sole cover sheet 40 across the exposed platform 30. The internal mechanisms include a series or rollers that are operatively connected to an electric motor 22 or manual input means. The sheet 40 is first attached to the primary roller 24, whereafter the sheet 40 is separated into upper 42 and lower 48 layers. The upper layer 42 is wrapped around a top collection roller 26, which comprises gears 27 that are operatively connected to the gears 25 of the primary roller 24. The bottom layer 48 is pulled through the slot 32, across the platform 30, through the opposing slot 32, over a rod 38, and wrapped around the bottom collection roller 28, thereby connecting the sheet 40 to each of the rollers.

The dispensing device 10 of the present invention may be activated by pressing activation buttons 72, by a motion sensor 34, or by manual input. The motion sensor identifies a user on the platform 30 and provides an electronic signal that actuates the motor, thereby facilitating the advancement of the sheet 40 over the platform 30 after the user has stepped away from the device and a subsequent pair of sole covers is desired. Alternatively, the device may be manually actuated by turning or depressing a knob 22' that is connected to the collection roller 28 and advances the same.

The present invention is configured to dispense an equal amount of sheet 40 each time the motor 22 is activated, thereby consistently locating the sole covers 50 on the platform 30 each time. However, if the sheet becomes displaced while removing a sole cover 50, buttons 72 located along the side of the base 20 may provide incremental reverse or forward movements of the sheet 40 in order to provide proper placement. Furthermore, when the sheet 40 nears the end of the roll, the reverse button 72 is capable of reversing the dispensing of the sheet 40, thereby bringing the upper 42 and lower layers 48 back together on the primary roller 24. Alternatively, the processor of the motion detector 34 may comprise a counter that records the number of times that the sheet has been dispensed across the platform 30. When a selected number of removed sheets 40 has been observed, the processor may direct the motor 22 to reverse the rollers and reassemble the upper 42 and lower 48 layers together on the primary roller 24, thereby enabling easy disposal of the sheet 40. In the manual embodiment, the user can selectively advance the roller based on manual inputs.

The present invention is designed for users who desire a device that reduces the spread of footwear-tracked dirt around a household. The device dispenses a pair of sole covers 50 that comprise an adhesive top layer 52, which is configured to attach onto the bottoms of a user's shoes and provide a layer of protection between the contaminants that lie on the bottom of the shoes and the house of a user.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A footwear sole cover dispensing device, comprising:
   a compartment that comprises an upper lid and a lower base portion;
   said compartment comprising a substantial U-shape having sides and a platform between said sides;
   said compartment comprising an internal volume;
   said sides having a first and second slot disposed therethrough that are adapted to allow access for a sheet of material to extend between said sides and above said platform;
   a plurality of rollers disposed within said internal volume, said rollers adapted to support a roll of said sheet of material;
   at least one electric motor for advancing at least one of said rollers and advancing said sheet of material across said platform.

2. The dispensing device of claim 1, wherein:
   said sheet of material further comprises an upper layer and a bottom layer in peelable connection with one another; and
   wherein said plurality of rollers further comprises:
     a first primary roller adapted to support said sheet of material;
     a second top collection roller adapted to collect said upper layer;
     an opposing bottom sheet collection roller adapted to collect said bottom layer and disposed within an opposite side of said compartment with respect to said first primary roller, and;
     a tensioning roller adjacent to said bottom sheet collection roller;
   said bottom layer being positioned over said platform and between said first primary roller and said tensioning roller.

3. The dispensing device of claim 1, wherein:
   said sheet of material further comprises an upper layer and a bottom layer in peelable connection with one another; and
   wherein said plurality of rollers further comprises:
     a first primary roller adapted to support said sheet of material;
     a second top collection roller adapted to collect said upper layer;
     an opposing bottom sheet collection roller adapted to collect said bottom layer and disposed within an opposite side of said compartment with respect to said first primary roller, and;
     a tensioning roller adjacent to said bottom sheet collection roller;
   said bottom layer being positioned over said platform and between said first primary roller and said tensioning roller;
   said at least one electric motor being operatively connected to said opposing bottom sheet collection roller;
   a first gear set connecting said first primary roller to a said second top collection roller;
   a pulley belt connecting said opposing bottom sheet collection roller to said first primary roller.

4. The dispensing device of claim 1, further comprising:
   a motion sensor adapted to monitor movement on said platform;
   said motion sensor being electrically connected to said at least one electric motor and configured to communicate to a motor processing means for activating said at least one electric motor.

5. The dispensing device of claim 1, further comprising:
   at least one advancement button electrically connected to said at least one electric motor and configured to communicate to a motor processing means for activating said motor.

6. The dispensing device of claim 5, wherein said at least one advancement button comprises a first and second directional button.

7. The dispensing device of claim 1, wherein said sheet of material comprises a peelable upper layer, a bottom layer, and a plurality of removable sole cover pairs therebetween.

8. A footwear sole cover dispensing device, comprising:
   a compartment that comprises an upper lid and a lower base portion;
   said compartment comprising a substantial U-shape having sides and an platform between said sides;
   said compartment comprising an internal volume;
   said sides having a first and second slot disposed therethrough that are adapted to allow access for a sheet of material between said sides and above said platform;
   a plurality of rollers disposed within said internal volume, said rollers adapted to support a roll of said sheet of material;
   a manual advancement means for advancing at least one of said rollers and advancing said sheet of material across said platform.

9. The dispensing device of claim 8, wherein:
   said sheet of material further comprises an upper layer and a bottom layer in peelable connection with one another; and
   wherein said plurality of rollers further comprises:
     a first primary roller adapted to support said sheet of material;
     a second top collection roller adapted to collect said upper layer;
     an opposing bottom sheet collection roller adapted to collect said bottom layer and disposed within an opposite side of said compartment with respect to said first primary roller, and;
     a tensioning roller adjacent to said bottom sheet collection roller;
   said bottom layer being positioned over said platform and between said first primary roller and said tensioning roller.

10. The dispensing device of claim 8, wherein:
said sheet of material further comprises an upper layer and a bottom layer in peelable connection with one another; and
wherein said plurality of rollers further comprises:
　a first primary roller adapted to support said sheet of material;
　a second top collection roller adapted to collect said upper layer;
　an opposing bottom sheet collection roller adapted to collect said bottom layer and disposed within an opposite side of said compartment with respect to said first primary roller, and;
　a tensioning roller adjacent to said bottom sheet collection roller;
said bottom layer being positioned over said platform and between said first primary roller and said tensioning roller;
said manual advancement means being operatively connected to said opposing bottom sheet collection roller;
a first gear set connecting said first primary roller to a said second top collection roller;
a pulley belt connecting said opposing bottom sheet collection roller to said first primary roller.

11. The dispensing device of claim 8, wherein said manual advancement means further comprises a turn knob.

12. The dispensing device of claim 8, wherein said manual advancement means further comprises a depressible foot pedal.

13. The dispensing device of claim 8, wherein said sheet of material comprises a peelable upper layer, a bottom layer, and a plurality of removable sole cover pairs therebetween.

* * * * *